United States Patent [19]

Warren

[11] 4,397,901
[45] Aug. 9, 1983

[54] COMPOSITE ARTICLE AND METHOD OF MAKING SAME

[76] Inventor: James W. Warren, 24300 Aetna St., Woodland Hills, Calif. 91367

[21] Appl. No.: 273,958

[22] Filed: Jun. 15, 1981

Related U.S. Application Data

[62] Division of Ser. No. 62,401, Jul. 31, 1979, Pat. No. 4,275,095.

[51] Int. Cl.³ .............................................. C23C 11/08
[52] U.S. Cl. ................................... 428/101; 427/228; 427/249; 427/419.7; 428/245; 428/280; 428/288; 428/367; 428/375; 428/391; 428/408
[58] Field of Search ............... 428/288, 367, 371, 391, 428/408, 280, 289, 245, 101; 427/227, 228, 249, 255.4, 255.5, 299, 333, 419.7, 431; 264/83, 232, 257; 423/447.3, 450

[56] References Cited

U.S. PATENT DOCUMENTS 3,925,577 12/1975 Fatzer et al. ........................ 427/249
4,178,413 12/1979 DeMunda ........................... 427/227

*Primary Examiner*—Paul J. Thibodeau
*Attorney, Agent, or Firm*—James E. Brunton

[57] ABSTRACT

A method of making a composite article and a composite article specifically adapted for use in high temperature, corrosive and errosive environments comprising a carbon fibrous substrate, including a pyrolytic carbon sheath formed about each fiber of the substrate; a metallic carbide, oxide, or nitride compliant coating over the coated fibers of the substrate; and an impermeable metallic carbide, oxide or nitride outer protective layer formed about the entire periphery of the coated substrate. In accordance with the method of the invention, the compliant metallic coating is applied to the fibers in a manner such that any mechanical stresses built-up in the substrate due to a mismatch between the coefficient of thermal expansion of the fibrous substrate and the coating are effectively accomodated.

13 Claims, 5 Drawing Figures

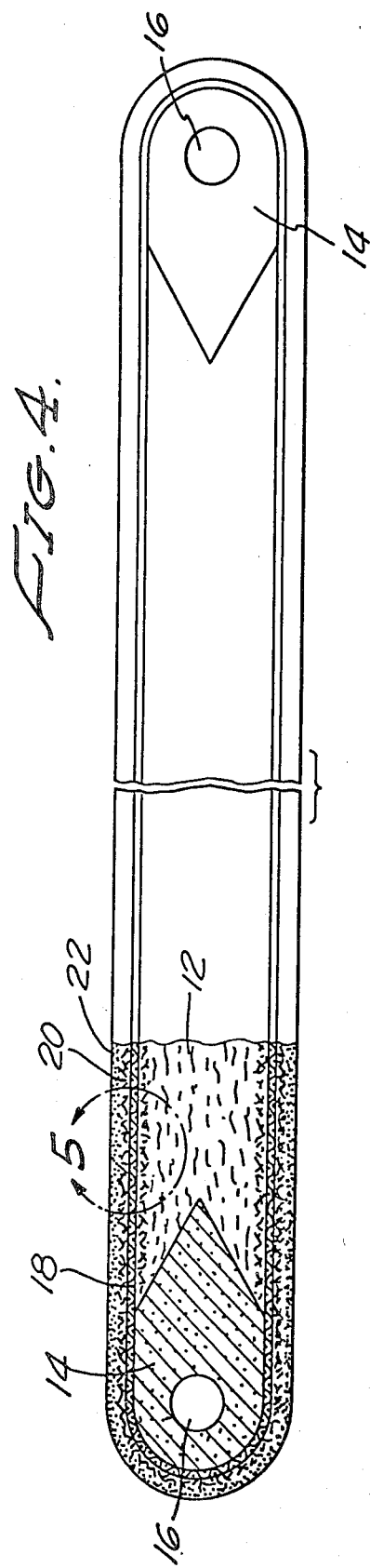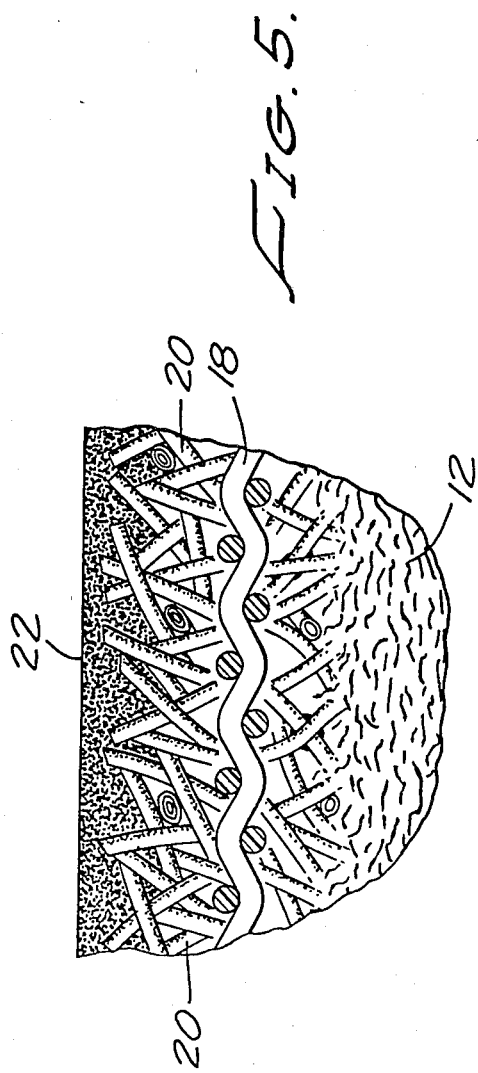

COMPOSITE ARTICLE AND METHOD OF MAKING SAME

This application is a division of application ser. No. 062,401, filed July 31, 1979 now U.S. Pat. No. 4,275,095.

BACKGROUND OF THE INVENTION

1. Field of the Invention

The present invention relates generally to carbon or ceramic-metallic composite articles and the method of making same. More particularly the invention relates to unique carbon-silicon composite articles for use in high temperature, hostile fluid environments.

2. Discussion of the Prior Art

During recent years considerable effort has been directed toward the search for structural materials having increasingly high temperature capabilities, and superior dimensional stability, corrosion resistance, erosion resistance and tolerance to damage. In this connection substantial work has been done with metals, monolithic ceramics and carbon-graphite materials. Metals display toughness and tolerance to damage but are relatively limited in their temperature capability. Monolithic ceramics can withstand high temperatures but are subject to oxidative degradation although both monolithic ceramics and carbon-graphite materials can withstand high temperatures and oxidative degradation, while carbon-graphite materials on the other hand are vulnerable to structural damage. In view of these facts the development of new composite materials has commanded considerable attention. Since composites can combine many of the attractive features of metals while ameliorating various of the structural and degradation problems associated with carbons and ceramics, they are ideally suited for very high temperature, hostile environment applications.

In pursuit of tough high temperature composites, various types of coating processes have been suggested. These processes generally involve contacting a molten metal and a carbon body under certain conditions, generally for the purpose of producing protective coatings for the carbon body in its environment of intended use. For example, Smiley U.S. Pat. No. 3,019,128 discloses applying molten metal to a carbon body to form a metal carbide surface layer, which in combination with metal and metal oxide layers, produces a refractory and heat transfer coating desirable on rocket nozzles and the like.

Similarly, Gurinsky U.S. Pat. No. 2,910,379 discloses a process in which molten metal is applied to a carbon liquid nuclear fuel container to prevent deleterious poisoning arising from graphite reaction with nuclear fuels and fission products.

Other coating disclosures involving molten metal-carbon body contact are Steinburg U.S. Pat. Nos. 2,929,741, Winter 2,597,964 and Acheson 895,531.

The U.S. Pat. to Fatzer et al, No. 3,925,577 describes a process for producing coated isotropic graphite members wherein a layer of silicon is first deposited on a graphite body and then the body is heated to a temperature to cause the silicon to melt and penetrate the pores of the graphite. Finally the article is coated with a layer of silicon carbide. In Hacke U.S. Pat. No. 3,348,967 a somewhat similar process is described in which graphite or charcoal bodies are impregnated with a molten metal which will react therewith to form carbide, thereby enabling the production of a wide variety of useful products. As will become clear from the discussion which follows, these prior art patents while generally related to the present invention are clearly distinguishable therefrom.

A common thread running through many of the prior art disclosures concerning metallic coating of carbonaceous materials, and one which serves to clearly distinguish the present invention, has been the heretofore unquestioned acceptance of the basic premise that the substrate material should be isotropic and that it must have an expansion coefficient approximating that of the coating. This has been traditionally believed necessary to prevent cracking and spalling of the coating due to stresses induced by differences in the expansion coefficients when the article is subjected to thermal cycling. The U.S. Pat. to Howard et al No. 3,393,085 discusses this premise in some detail.

Another well established prior art premise was that the metallic coatings should have an adherent mechanical or chemical bond to the substrate material to assure proper load transfer and to guarantee the structural integrity of the coated composite system. As will be discussed in greater detail hereinafter, Applicant has also found this latter requirement to be not only unnecessary, but, in fact undesirable in the practice of his invention.

By way of example and to illustrate the aforementioned prior art concepts, graphite susceptions have long been used to heat silicon wafers for semiconductor processing. Because graphite is very porous and provides a means of entrapping undesirable gases and other contaminants, the susceptors are typically coated with a chemical vapor deposited (CVD) silicon carbide to render them impermeable and non-reactive. Because silicon carbide has a high coefficient of thermal expansion (CTE) of on the order of 4.5 to 5.0 in/in/°C., a high expansion 4.2 in/in/°C. nominal CTE graphite is used as the substrate material to assure an economic susceptor life. It is well known, however, that the actual characteristics exhibited by graphite materials can vary 10 to 15% from the nominal values described in the literature. Accordingly, given substrate characteristics, including CTE characteristics, vary widely from lot to lot. As a result of these variations in substrate expansion coefficients, the economic life of the susceptors is quite unpredictable. Compounding the problem is the fact that coating life is also highly variable and directly relates the matching of coating and substrate expansion coefficients. Thus, current practice by susceptor manufacturers is to guarantee susceptors for not more than four complete temperature cycles.

In a similar vein, various prior art U.S. Pat. including Nos. 2,512,230 and 1,948,382 describe composites comprising coatings of silicon carbide on monolythic and composite carbonaceous substrates to provide erosion protection for the substrate as well as interlayer support and bonding between the substrate and coating. In such applications it has been uniformly taught that the thermal expansion coefficients of the substrate should approximate that of the interlayer of coating if cracking or spalling of the interlayer coating is to be prevented.

For the reasons previously discussed, great difficulty has been experienced in satisfactorily and economically manufacturing composite articles suitable for very high temperature applications in which the coefficient of thermal expansion of the coating and the substrate is matched and in which the coating satisfactorily adheres to the base material.

As will be appreciated from the discussion which follows, the process of the present invention totally overcomes the prior art problems of coating adherency and CTE matching and provides a unique CTE mismatched composite article which will maintain its dimensional stability and will effectively resist corrosion even in hostile environments at very high temperatures.

In addition to the previously identified prior art patents, applicant is familiar with the following U.S. Pat. Nos. which serve to vividly illustrate the high degree of novelty of the present invention: 3,914,508, 3,762,644, 3,759,353, 3,676,179, 3,673,051, 3,275,467, 2,614,947, 1,948,382.

SUMMARY OF THE INVENTION

It is an object of the present invention to provide a structurally unique composite article consisting of a multiphase system comprising a carbon fiberous substrate, a metallic carbide, oxide or nitride compliant coating over the fibers of the substrate and an impermeable metallic carbide, oxide or nitride outer protective layer or seal coat formed about the periphery of the coated substrate.

It is another object of the invention to provide a composite article of the aforementioned character which will substantially maintain its dimensional stability and strength even under severe high temperature oxidizing conditions.

It is another object of the invention to provide a composite article of the class described which is substantially resistant to corrosion and erosion by high temperature, hostile gas, particulate and fluid environments.

It is a particularly important object of the present invention to provide a composite article of the character described in the preceeding paragraphs in which the aforementioned metallic carbide, oxide or nitride compliant coating is controllably applied to the carbon fibrous substrate in a manner such that any mechanical stresses built up in the substrate due to mismatches in coefficients of thermal expansion between the fiberous substrate and the coatings are effectively accomodated or relieved.

It is a further important object of the present invention to provide a process for making composite articles of the character described in the preceeding paragraphs in which the metallic carbide, oxide or nitride compliant coating is controllably applied to the carbon fibrous substrate in a manner such that the individual fibers of the substrate are free to move relative to the applied coating.

More particularly, it is an object of the invention to provide a process as described in the previous paragraph in which a pyrolytic carbon coating is first deposited by chemical vapor deposition (CVD) about each of the fibers in such a manner that each fiber is substantially encased in a non-adherent pyrolytic carbon casing and then a metallic carbide, oxide or nitride coating is applied over the coated fibers in such a manner that the fibers remain freely movable relative to the applied coatings.

It is another object of the invention to provide a composite article as described in the previous paragraph in which each fiber of the substrate is encased in a uniform CVD type carbon casing to promote superior load transfer from fiber to fiber when the article is stressed. This CVD carbon casing also provides a mechanical interface for increasing the surface fracture energy of the composite structure thus resulting substantial toughness and flaw resistance.

It is still another object of the invention to provide a process of the aforementioned character in which, following the coating of the fibers, an impermeable carbide, nitride or oxide coating is controllably formed about the entire periphery of the substrate to seal it against hostile environments.

In summary, these and other objects of the invention are realized by a composite article produced by a method comprising the steps of forming a starting substrate from a multiplicity of carbon fibers selected from a group consisting of pyrolyzed wool, rayon, polyacrylonitrile and pitch fibers; suspending the starting substrate within a first controlled environment; forming an intermediate substrate by heating the starting substrate to a temperature of between approximately 1500° F. and approximately 2200° F. while exposing the starting substrate to a hydrocarbon gas to form a uniform layer of pyrolytic carbon about each of the fibers in the starting substrate; removing the intermediate substrate from said first controlled environment and forming it into a shaped substrate having the approximate shape desired of the end product composite article; supporting the shaped substrate in a second controlled environment while heating it to a temperature of between approximately 1800° F. and approximately 3200° F.; and forming a diffusion coated article by reacting the shaped substrate with a siliceous material for a period of time sufficient to permit the silicon to react with the pyrolytic carbon coating deposited on the fibers.

BRIEF DESCRIPTION OF THE DRAWINGS

FIG. 4 is a side elevational view, partly in section showing a test section of a net dimension turbine augmentor divergent flap manufactured in accordance with the method of the present invention.

FIG. 5 is a greatly enlarged fragmentary cross-sectional view of the area designated in FIG. 4 as "5" illustrating diagramatically the nature of the internal configuration of the test section.

DISCUSSION OF THE PREFERRED EMBODIMENTS

Figure 1:
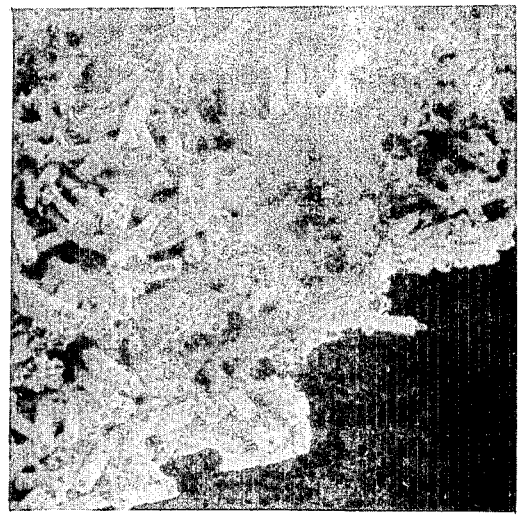
FIG. 1 is a reproduction of a photomicrograph (70×) showing the appearance of the coated fibrous substrate of the invention prior to the application of the final seal coat.

Before proceeding with a detailed discussion of the preferred embodiments of the present invention, the following definitions of the technical terms used herein are presented to facilitate a clear understanding of the nature and scope of the invention:

1. Composite product—a product comprising a carbon, graphite or ceramic substrate and one or more metallic carbide, oxide or nitride coatings over the substrate material.
2. Starting or basic substrate—as used herein, the starting substrate or interim product shape before the application of a metallic coating.
3. Carbon fibrous substrate—a starting substrate comprising carbon material in fibrous form.

4. Fiber volume—volume of carbon fibers present in the given substrate.
5. Non-woven—coherent fibrous material formed without interlacing of threads, such as batting or felt.
6. Woven—fabric formed by interlacing warp and filling threads on a loom, or the like.
7. Ceramic—metallic or other inorganic oxides generally classed as glass-forming oxides.
8. Pyrolytic or "CVD" material—a material made from the thermal decomposition of a gas containing the material.

Stated in simple terms, the composite article of the invention consists of a three or more phase system comprising a basic substrate of carbon fibrous and/or ceramic materials, a metallic carbide, oxide or nitride compliant layer over the substrate and an impermeable carbide, oxide or nitride protective layer formed over the entire periphery of the coated substrate. An important feature of the article is the absence of a strong bond between the fibers and the matrix system to accommodate the mismatch in expansion coefficient between the fibrous substrate and the carbide, oxide or nitride compliant and protective layers.

The articles of the invention are well suited for a variety of applications including turbine rotors, turbine augmentor divergent flaps and Diesel engine pre-combustion chambers made up of a carbon fiber, carbon (resin and/or pitch char and/or CVD deposit) matrix component which has been preformed to a selected component net geometry. Each of the substrate fibers is encased in a non-adherent, uniform, CVD type carbon case so as to promote good load transfer from fiber to fiber when the article is stressed. This also provides a mechanical interface for increasing the surface fracture energy of the composite structure, thus resulting in greater toughness and flaw resistance.

Because carbon/carbon composites actively react with oxygen when heated to temperatures in excess of 300° C., the outer portions of the article are reacted with silicon to form a continuous silicon carbide case around each of the fibers. This treatment effectively imparts a porous silicon carbide shell about the periphery of the selected carbon substrate geometry. The expansion coefficient of this shell is essentially that of monolithic silicon carbide, approximately two times that of the carbon preform. In practice, a mis-match in expansion coefficients of only a few percent between the substrate and the coating or outer shell is sufficient to induce mechanical stresses which cause cracking and ultimate failure of the protective layer or oxidation of the substrate. The lack of bond between the fiber and the carbon and silicon carbide case, however, allows the carbon fibers and silicon carbide case to move independent of one another on a microscopic scale, thus providing a compliance mechanism that effectively reduces thermally induced mechanical stresses. The appearance of the coated fibers is clearly illustrated in FIGS. 1 and 2 of the drawings.

The article in this interim state with its compliant outer shell of silicon carbide remains quite porous. Therefore, to provide complete protection for use in high temperature oxidizing environments, a subsequent infiltration of the porous compliant layer with impermeable CVD silicon carbide is applied to seal the surface with a meterial whose expansion coefficient is compatible with that of the compliant layer. The final article thus formed is remarkably stable and highly corrosion resistant even in extreme environments.

Referring briefly to FIGS. 4 and 5 of the drawings, one form of article made by the method of the invention is there illustrated. This article, which is a test section of a turbine augmentor divergent flap, comprises a central section 12 made up of carbon felt, chopped fiber or macerated material. At each end of the test section is a solid end portion 14 made from a carbon/carbon high strength material, such as is commercially available from the Hitco Division of Arco. Each end section 14 is provided with a bore 16 adapted to receive a pivot pin or rod.

Surrounding the central section 12 and end portions 14 is a material layer 18 comprising a woven carbon fibrous material such as carbon or graphite cloth commercially available from The Union Carbide Company and others. Formed about the article thus constituted, and in conjunction therewith comprising the starting substrate of this embodiment of the invention, is a carbon fibrous material generally designated by the numeral 20.

In a manner which will be described in greater detail in the paragraphs which follow, the individual fibers of the material 20 are coated with a layer, or sheath, of CVD carbon and then with a compliant layer of silicon carbide. Finally, the entire surface of the test specimen is sealed with an outer layer 22 of CVD silicon carbide which extends about the entire periphery of the article.

Figure 2:
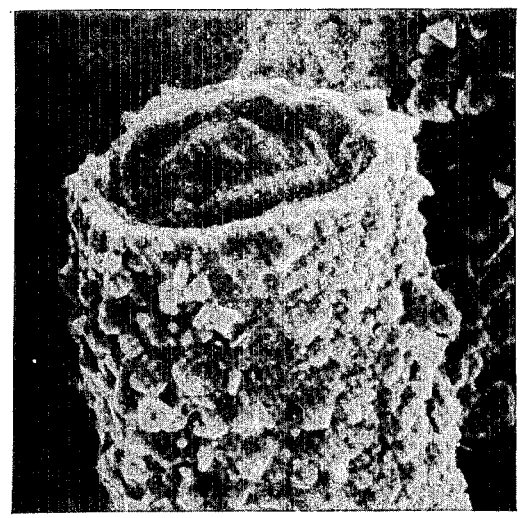
FIG. 2 is a reproduction of a photomicrograph (1500×) illustrating the appearance of the coated fibers of the carbonaceous fibrous substrate.
Figure 3:
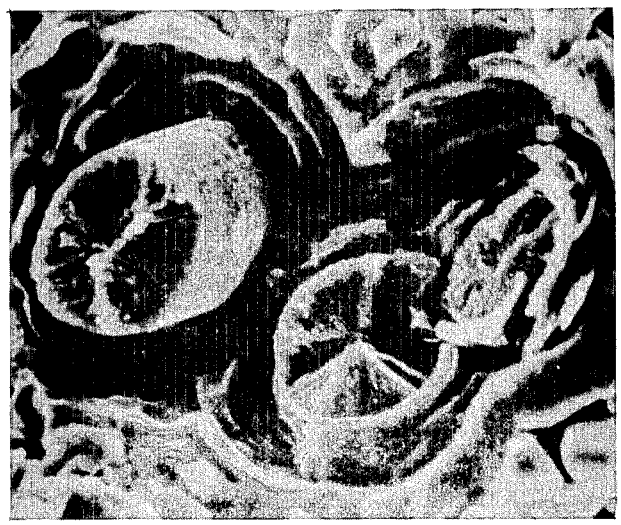
FIG. 3 is similar to FIG. 2 showing a reproduction of a photomicrograph (2200×) of the coated fibers.

Referring to FIG. 1, the character of the coated fibrous material 20 is there vividly illustrated. FIG. 1 is a reproduction of a photomicrograph of the coated fibrous material at 70 times magnification. Turning to FIG. 2, which is a reproduction of a photomicrograph at 1500 times magnification, the fiber, the CVD coating about the fiber and the silicon carbide coating superimposed thereupon, are clearly visible. In FIG. 3, which is a reproduction of a photomicrograph taken at 2200 times magnification, the ends of the individual fibers can clearly be seen protruding from the CVD carbon coating and the compliant coating of silicon carbide. As will be appreciated from the examples which follow, the compliant silicon carbide coating is applied to the fibers in a manner such that any mechanical stresses built up in the substrate due to a mismatch between the coefficient of thermal expansion of the fibrous substrate and the coating are effectively accommodated. This important feature of the present invention is clearly illustrated in FIGS. 2 and 3 of the drawings.

It is to be appreciated that the article shown in FIGS. 4 and 5 of the drawings is merely exemplary of the type of products which can be made in accordance with the method of the present invention. Other highly useful products of the invention include turbine rotors, deisel engine combustion chambers, and numerous specially designed products for nuclear and aerospace applications.

As will be clearly illustrated by the examples which follow, the method of the invention stated in simple terms comprises the following steps: First, a multiplicity of carbon fibers such as rayon fibers are assembled into a basic or starting substrate. Next the starting substrate is placed in a controlled environment, heated to between about 1500° F. and 4200° F. and exposed to a carbonaceous gas such as methane. During this step a uniform layer of CVD carbon is deposited about each of the fibers of the substrate. Following this step the interim substrate thus formed is machined or otherwise formed into the approximate shape of the end product. Next the shaped substrate formed in the previously described step is placed in a second controlled environment and heated to about 1800° F. to about 3200° F. The heated shaped substrate is then reacted with a siliceous material for a period of time sufficient to permit the silicon to react with the CVD carbon coating deposited on the fibers. Finally, the article thus formed is once again heated in a controlled environment and exposed to a gas containing carbon and silicon such as trichlorosilane. This step forms a uniform CVD seal coating of silicon carbide about the entire periphery of the article.

EXAMPLE NO. 1

Using carbonized rayon felt as a starting material, a starting substrate was constructed. In this instance the starting substrate was approximately 4 inches wide, 8 inches long and about 1 inch thick. The density of the substrate was on the order of 0.1 gm/cc and the fiber volume was about 15%. Next, the starting substrate, along with several control specimens, was placed into a first controlled environment, which in this case was a vacuum chemical vapor deposition furnace of conventional design. The temperature of the substrate was then raised to about 1800° F. while a vacuum of on the order of 15 mm Hg was maintained within the deposition chamber. A secondary, or intermediate, substrate was formed by controllably flowing methane gas interstitially of the substrate for a period of time of about 50 hours. Through this technique a uniform layer of pyrolytic carbon was deposited about each of the fibers within the substrate to form an intermediate substrate having a density of on the order of 0.75 gm/cc.

Following the aforementioned infiltration step, the intermediate substrate was cooled, removed from the vacuum furnace and transferred to a machining area. In the machining area the intermediate substrate was machined in a conventional manner to form a shaped substrate. In this instance the shaped substrate was constructed in the configuration of a net dimension turbine augmentor divergent flap test section approximately 6 inches wide by 6 inches long by ½ inch thick (see FIG. 1).

Following the machining step, the divergent flap section, or shaped substrate was supported in a vacuum chamber, or second controlled environment directly above a crucible containing molten elemental silicon. The shaped substrate was then heated to about 2700° F. in a mild vacuum. With the substrate at this elevated temperature it was lowered into the molten silicon and maintained totally immersed for about four minutes. Following immersion the diffusion coated substrate was withdrawn from the molten silicon and maintained at temperature in a position directly above the silicon crucible for a period of time of about two minutes.

Next, the diffusion coated article thus formed was cooled, removed from the vacuum chamber and transferred to an inspection area. Following removal of the excess silicon by means of an etching process, precision dimension inspection was performed on the part. This inspection revealed that the diffusion coated article exhibited the dimensions of the shaped substrate within plus or minus 0.002 inches. Visual inspection of the control specimens which had been similarly processed showed the carbon fibers to be essentially unaffected by the methane or silicon treatment. Only the ends of the fibers exposed by the machining showed any signs of reaction with the silicon. Importantly, no bond was found to exist between the carbon fibers and the silicon carbide coating formed by reacting the shaped substrate with the molten silicon. On the other hand, a reaction with the CVD carbon deposited on the fibers during the preliminary methane treatment was most evident. This reaction, however, was confined to the CVD carbon sheath surrounding each of the fibers. In all cases no chemical or diffusion bonds were observed to exist between the fiber and/or matrix system. Accordingly, the fibers were free to move at a different rate from the carbon and/or silicon carbide and silicon matrix systems. This highly novel and important feature of the diffusion coated article of the present invention effectively minimizes any residual stresses tending to occur within the article. By comparison, a graphite body processed in a comparable fashion to that just described would exhibit significant internal residual stresses. These stresses result from an inherent mismatch in the thermal expansion coefficient (CTE) between the graphite article itself and the coatings applied thereto. The effect of these stresses are often catastrophic causing article cracking, crazing and/or spalling of the coatings.

Following dimensional inspection of the diffusion coated article, it was returned to the first controlled environment, or vacuum chemical vapor deposition furnace. Once in place within the CVD apparatus, the article was heated to about 2200° F. and a gas containing dimethyl-dichlorosilane was controllably passed over and about the article. Due to the porous nature of the diffusion coated article formed by the novel method of the present invention, a uniform coating of CVD silicon carbide was deposited over the coated fibers of the article and about the periphery thereof. This step provided an impermeable skin of silicon carbide over the entire diffusion coated article rendering it virtually impervious to corrosion and erosion caused by high temperatures and exposure to hostile gas and fluid environments. Subsequent testing and evaluation of the two phase compliant layer type coated article thus formed under extremely hostile environments showed it to be highly stable and remarkably resistant to thermally induced cracking, crazing or spalling.

EXAMPLE NO. 2

In constructing the starting substrate of this example chopped fibers of carbonized polyacrylonitrile were used. This substrate was also about 4 inches wide, 8 inches long and about 1 inch thick. The fiber volume of the substrate was on the order of 35%.

The starting substrate was placed into a vacuum furnace and the fibers thereof coated with pyrolytic carbon in the manner described in Example No. 1. However, propane was used in lieu of methane as the carbonaceous gas.

After infiltration the substrate was removed from the CVD furnace and was machined into a shaped substrate in the manner of Example No. 1.

Following machining, the intermediate substrate was heated to about 3200° F. in a second controlled environment maintained at slightly greater than atmospheric pressure and a slurry of elemental silicon was deposited on the pyrolytic carbon coated fibers.

The silicon coated article thus formed was dimensionally inspected and returned to the vacuum furnace wherein it was once again heated to about 3200° F. While being maintained at this elevated temperature a gas containing carbon and silicon, as for example trimethyl-chlorosilane was passed over and about the article to deposit a uniform coating of silicon nitride over the coated fibers and about the periphery of the article.

Rigorous testing of the article showed it to be dimensionally stable and resistant to cracking, crazing and spalling even in hostile gas environments and at high temperatures.

EXAMPLE NO. 3

A carbonized rayon cloth made up of interwoven carbon fibers was cut into circular shaped pieces having a diameter of about 4 inches. A disc shaped starting substrate was constructed by stacking a plurality of the circular shaped pieces onto a base plate of a compression fixture. Each layer of cloth was rotated slightly with respect to the preceeding layer and a top plate was placed over the assembly and bolted to the base plate. The assembly was then compressed to bring the cloth layers into intimate contact. The starting substrate thus formed exhibited a fiber volume of about 35% and a fiber density of about 1.5 gm/cc.

Next the starting substrate, along with the compression fixture, was placed into a CVD vacuum furnace and in the manner previously described, pyrolytic carbon was uniformly deposited over each of the fibers comprising the disc shaped starting substrate.

The intermediate substrate thus formed was removed from the compression fixture and machined to form a disc about 3½ inches in diameter and about 1 inch thick.

Following machining, the substrate was returned to the CVD vacuum furnace and heated to a temperature of about 2200° F. A gas containing dichlorosilane was passed over and about the shaped substrate for a period of time of about 3 hours to form a diffusion coated article in which a silicon coating was formed about each of the coated fibers of the intermediate substrate. The temperature of the substrate was then raised to about 2700° F. to cause a reaction between the silicon and pyrolytic carbon to form silicon carbide.

After undergoing another dimensional inspection, the still porous, diffusion coated article was returned to the vacuum furnace for final coating with silicon carbide in the manner described in Example No. 1. Once again the two phase, compliant layer coated article thus formed exhibited remarkable stability and durability during severe environmental testing.

EXAMPLE NO. 4

Using a tape material made up of closely woven, carbonized PAN fibers, a cylindrical shaped starting substrate was constructed by wrapping the tape about a mandrel. This substrate exhibited density of about 0.83 gm/cc and a fiber volume of about 40%.

The substrate was removed from the mandrel and placed into a vacuum furnace wherein pyrolytic carbon was deposited on the fibers thereof in the manner described in Example No. 1, but using acetylene as the feed gas.

Next the intermediate substrate was machined and then reacted with a siliceous material as in Example No. 1 to form a diffusion coated substrate.

Finally the diffusion coated article thus formed was coated with a seal coat of silicon carbide by heating it under vacuum to a temperature of on the order of 1800° F. and exposing it to a gas containing carbon and silicon as for example trimethyl-chlorosilane. This final step formed a uniform CVD coating of silicon carbide over the coated fibers and the periphery of the article rendering it virtually impervious to corrosion and erosion caused by high temperatures and exposure to hostile fluids.

EXAMPLE NO. 5

In constructing the starting substrate of this example the starting material used was a macerated material comprising a multiplicity of randomly oriented pyrolyzed wool fibers. This starting material was formed into a substrate which was approximately 4 inches wide, 8 inches long and about 1 inch thick, and exhibited a fiber density of on the order of 35%. The starting substrate was processed in the manner described in Example No. 1 except that silicon tetrachloride was used in applying the final coating to the diffusion coated article.

EXAMPLE NO. 6

Using a macerated material having a multiplicity of chopped pitch fibers a starting substrate was constructed as in Example No. 1. This starting substrate which exhibited a fiber volume of about 60% was also processed as described in Example No. 1 save that silicon dibromide was used in the final coating step.

EXAMPLE NO. 7

Using a starting substrate constructed and processed in the manner described in Example No. 3, a diffusion coating was applied by placing the substrate in a pack containing granular silicon carbide, aluminia and silicon. The pack and substrate were then slowly raised in temperature to about 3200° F. over a five day period to form a diffusion coating on the substrate material. A final, or seal coating was applied about the periphery of the coated substrate in the manner described in Example No. 1.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A carbon-silicon composite anisotropic article comprising a multiplicity of carbon fibers forming a shaped article, a coating of pyrolytic carbon extending over each of said fibers, a reaction formed diffusion coating of silicon extending substantially over each of said pyrolytic carbon coated fibers and substantially over the outer periphery of the article, said pyrolytic carbon coating and said silicon coating having been applied to said fibers in a manner whereby said fibers are free to move relative to said coatings, said carbon fibers and said silicon coating having a different coefficient of thermal expansion.

2. A carbon-silicon composite article as defined in claim 1 in which said reaction formed diffusion coating consists of silicon carbide.

3. A carbon-silicon composite article as defined in claim 1 in which said reaction formed diffusion coating consists of silicon nitride.

4. A carbon-silicon composite article as defined in claim 1 in which said reaction formed diffusion coating consists of silicon oxide.

5. A carbon-silicon composite article as defined in claim 1 in which a coating of chemical vapor deposited silicon carbide extends substantially over each of said coated fibers and substantially over the outer periphery of said article.

6. A carbon-silicon composite article as defined in claim 1 wherein the density of said article is between 0.3 gm/cc and 3.0 gm/cc.

7. A carbon-silicon composite article as defined in claim 1 wherein said multiplicity of carbon fibers forming the shaped article are in the form of a woven material having a multiplicity of interwoven carbon fibers.

8. A carbon-silicon composite article as defined in claim 1 wherein said multiplicity of carbon fibers forming the shaped article are in the form of a felt material having a multiplicity of randomly oriented fibers.

9. A carbon-silicon composite article as defined in claim 1 wherein said multiplicity of carbon fibers forming the shaped article are in the form of a macerated material having a multiplicity of randomly oriented fibers.

10. A carbon-silicon composite article as defined in claim 1 in which said carbon fibers forming said shaped article are pyrolyzed rayon.

11. A carbon-silicon composite article as defined in claim 1 in which said carbon fibers forming said shaped article are pyrolyzed polyacrylonitrile.

12. A carbon-silicon composite article as defined in claim 1 in which said carbon fibers forming said shaped article are wool.

13. A carbon-silicon composite article as defined in claim 1 in which said carbon fibers forming said shaped article are pitch fibers.

* * * * *